US 8,910,523 B2

(12) United States Patent
Shen

(10) Patent No.: US 8,910,523 B2
(45) Date of Patent: Dec. 16, 2014

(54) CAPACITIVE ACCELEROMETER

(75) Inventor: Ching-Kai Shen, Taipei (TW)

(73) Assignee: RichWave Technology Corp., NeiHu District, Taipei (TW)

( * ) Notice: Subject to any disclaimer, the term of this patent is extended or adjusted under 35 U.S.C. 154(b) by 384 days.

(21) Appl. No.: 13/397,684

(22) Filed: Feb. 16, 2012

(65) Prior Publication Data

US 2013/0074599 A1 Mar. 28, 2013

(30) Foreign Application Priority Data

Sep. 26, 2011 (TW) .............................. 100134567 A

(51) Int. Cl.
*G01P 15/125* (2006.01)
*G01P 15/18* (2013.01)
*G01P 15/08* (2006.01)

(52) U.S. Cl.
CPC ......... *G01P 15/125* (2013.01); *G01P 2015/082* (2013.01); *G01P 2015/0831* (2013.01); *G01P 15/18* (2013.01)
USPC ...................................................... 73/514.32

(58) Field of Classification Search
CPC ............................... G01P 15/125; G01P 15/18
USPC ....................................................... 73/514.32
See application file for complete search history.

(56) References Cited

U.S. PATENT DOCUMENTS

| 5,908,986 | A  | * | 6/1999 | Mitamura | ................... | 73/504.12 |
| 6,990,864 | B2 | * | 1/2006 | Sakai | .......................... | 73/514.32 |
| 7,024,933 | B2 | * | 4/2006 | Malametz | ................... | 73/514.32 |
| 7,562,573 | B2 | * | 7/2009 | Yazdi | ........................... | 73/514.32 |
| 7,793,544 | B2 | * | 9/2010 | Merassi et al. | ............. | 73/514.32 |
| 7,886,601 | B2 | * | 2/2011 | Merassi et al. | ............. | 73/514.32 |
| 2006/0169043 | A1 | | 8/2006 | McNeil | | |
| 2009/0139330 | A1 | | 6/2009 | Pavelescu | | |

FOREIGN PATENT DOCUMENTS

| CN | 1866031 | 11/2006 |
| CN | 101504426 | 8/2009 |
| TW | 200635847 | 10/2006 |

* cited by examiner

*Primary Examiner* — John Chapman, Jr.
(74) *Attorney, Agent, or Firm* — Winston Hsu; Scott Margo

(57) ABSTRACT

A capacitive accelerometer includes a substrate and a first semiconductor layer. The first semiconductor layer is disposed on the substrate and includes a first mass, first and second anchors, first and second elastic members, and first and second comb capacitor sets. The first and second anchors are disposed at positions corresponding to first and second axes respectively. The first elastic member is connected to the first mass and the first anchor in a manner of bending back and forth perpendicular to the first axis. The second elastic member is connected to the first mass and the second anchor in a manner of bending back and forth perpendicular to the second axis. The first and second comb capacitor sets are disposed at positions corresponding to the second and first axes respectively and connected to the first mass. The first axis is perpendicular to the second axis.

18 Claims, 5 Drawing Sheets

CAPACITIVE ACCELEROMETER

BACKGROUND OF THE INVENTION

1. Field of the Invention

The present invention relates to an accelerometer, and more specifically, to a capacitive accelerometer.

2. Description of the Prior Art

In general, a conventional three-axis capacitive accelerometer utilizes three independent masses with the related sensing electrode components to sense accelerations in an X-axis, a Y-axis, and a Z-axis independently. Although this design can prevent the linearity and sensitivity of each sensing axis of the capacitive accelerometer from being interfered by other sensing axes of the capacitive accelerometer, this design needs to increase the overall volume of the capacitive accelerometer for reducing mechanical noise received by the capacitive accelerometer, so as to make the capacitive accelerometer oversized. Thus, it should be a concern for a capacitive accelerometer to reduce its overall volume and increase its sensitivity and linearity.

SUMMARY OF THE INVENTION

The present invention provides a capacitive accelerometer including a substrate and a first semiconductor layer. The first semiconductor layer is disposed on the substrate and includes a first mass, at least one first anchor, a first elastic member, at least one first combo capacitor set, at least one second anchor, a second elastic member, and at least one second combo capacitor set. The first anchor is located at least one side of the first mass corresponding to a first axis. The first elastic member is connected to the first mass and the first anchor in a manner of bending back and forth perpendicular to the first axis, for making the first mass move elastically along the first axis when a force is applied to the first mass in the first axis. The first combo capacitor set is connected to at least one side of the first mass corresponding to a second axis. The second anchor is located at least one side of the first mass corresponding to the second axis. The second elastic member is connected to the first mass and the second anchor in a manner of bending back and forth perpendicular to the second axis, for making the first mass move elastically along the second axis when a force is applied to the first mass in the second axis. The second combo capacitor set is connected to at least one side of the first mass corresponding to the first axis. The first axis is perpendicular to the second axis.

The present invention further provides a capacitive accelerometer including a substrate and a first semiconductor layer. The first semiconductor layer is disposed on the substrate and includes a first mass, at least two first anchors, two first elastic members, at least one first combo capacitor set, at least two second anchors, two second elastic member, and at least one second combo capacitor set. The two first anchors are respectively located at least one side of the first mass corresponding to a first axis. The two first elastic members are respectively connected to the first mass and the first anchor in a manner of bending back and forth parallel to the first axis, for making the first mass move elastically along a second axis when a force is applied to the first mass in the second axis. The first combo capacitor set is connected to at least one side of the first mass corresponding to the first axis. The two second anchors are respectively located at least one side of the first mass corresponding to the first axis. The two second elastic members are respectively connected to the first mass and the corresponding second anchor in a manner of bending back and forth parallel to the second axis, for making the first mass move elastically along the first axis when a force is applied to the first mass in the first axis. The second combo capacitor set is connected to at least one side of the first mass corresponding to the second axis. The bending times of the two first elastic members are different from each other, and the first axis is perpendicular to the second axis.

The present invention further provides a capacitive accelerometer including a substrate and a first semiconductor set. The first semiconductor layer is disposed on the substrate and includes a first mass, at least one first anchor, a first elastic member, at least one first combo capacitor set, at least one second anchor, a second elastic member, and at least one second combo capacitor set. The first anchor is located at least one side of the first mass corresponding to a first axis. The first elastic member has a first bending structure and a first step structure. The first bending structure is connected to the first anchor in a manner of bending back and forth corresponding to the first axis. The first step structure is connected between the first mass and the first bending structure. The first combo capacitor set is connected to at least one side of the first mass corresponding to the first axis. The second anchor is located at least one side of the first mass corresponding to a second axis. The second elastic member has a second bending structure and a second step structure. The second bending structure is connected to the second anchor in a manner of bending back and forth corresponding to the second axis. The second step structure is connected between the first mass and the second bending structure. The second combo capacitor set is connected to at least one side of the first mass corresponding to the second axis. The first axis is perpendicular to the second axis.

The present invention further provides a capacitive accelerometer including a substrate and a first semiconductor layer. The first semiconductor layer is disposed on the substrate and includes a first mass, at least two first combo capacitor sets, at least one anchor, a first elastic member, at least one two second capacitor sets, at least one second anchor, and a second elastic member. The two first combo capacitor sets are connected to least one side of the first mass corresponding to a first axis. The first anchor is disposed between the two first combo capacitor sets. The first elastic member is connected between the first mass and the first anchor in a manner of bending back and forth corresponding to the first axis. The two second combo capacitor sets are connected to at least one side of the first mass corresponding to a second axis. The second anchor is disposed between the two second combo capacitor sets. The second elastic member is connected between the first mass and the second anchor in a manner of bending back and forth corresponding to the second axis. The first axis is perpendicular to the second axis.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
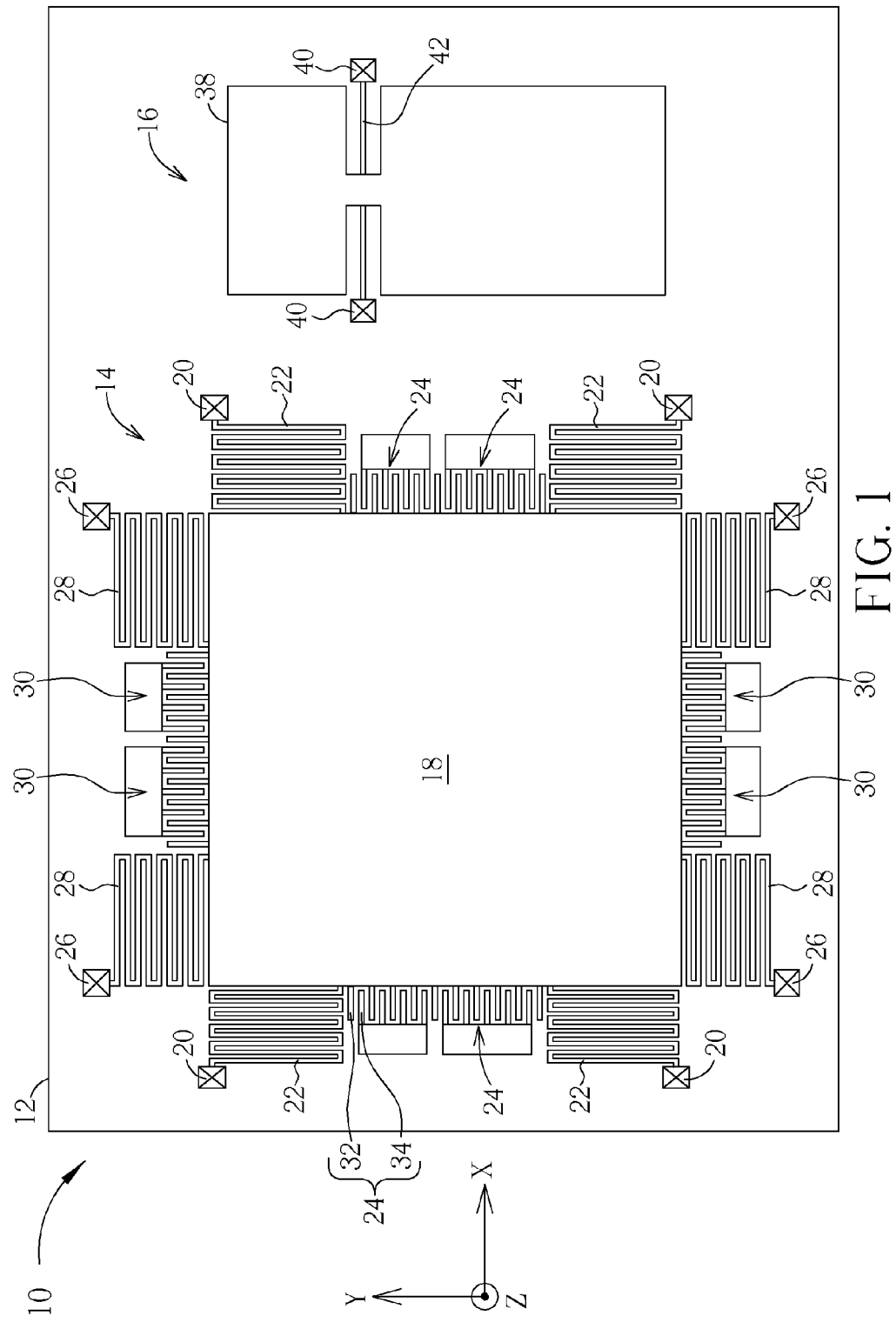
FIG. 1 is a top view of a capacitive accelerometer according to a first embodiment of the present invention.

Please refer to FIG. 1, which is a top view of a capacitive accelerometer 10 according to a first embodiment of the present invention. As shown in FIG. 1, the capacitive accelerometer 10 includes a substrate 12, a first semiconductor layer 14, and a second semiconductor layer 16. The substrate 12 can be made of insulation material (e.g. glass or ceramics) for holding the first semiconductor layer 14 and the second semiconductor layer 16. The second semiconductor layer 16 is located at a side of the first semiconductor layer 14. More detailed description for the structural designs of the first semiconductor layer 14 and the second semiconductor layer 16 is provided as follows.

The first semiconductor layer 14 includes a first mass 18, at least one first anchor 20, at least one first elastic member 22, at least one first combo capacitor set 24, at least one second anchor 26, at least one second elastic member 28, and at least one second combo capacitor set 30. In this embodiment, numbers of the first anchor 20, the first elastic member 22, the first combo capacitor set 24, the second anchor 26, the second elastic member 28, and the second combo capacitor set 30 are four respectively as shown in FIG. 1. The first mass 18 can be made of semiconductor material (e.g. silicon material).

In this embodiment, the first anchor 20 is located two sides of the first mass 18 corresponding to a first axis (i.e. an X-axis direction as shown in FIG. 1) respectively. The second anchor 26 is located at two sides of the first mass 18 corresponding to a second axis (i.e. a Y-axis direction as shown in FIG. 1) perpendicular to the first axis respectively. The first elastic member 22 is connected between the first mass 18 and the first anchor 20 in a manner of bending back and forth perpendicular to the first axis (as shown in FIG. 1), for providing elastic force to make the first mass 18 move elastically along the first axis when a force is applied to the first mass 18 in the first axis. The second elastic member 28 is connected between the first mass 18 and the second anchor 26 in a manner of bending back and forth perpendicular to the second axis (as shown in FIG. 1), for providing elastic force to make the first mass 18 move elastically along the second axis when a force is applied to the first mass 18 in the second axis.

The first combo capacitor sets 24 are respectively connected to two sides of the first mass 18 corresponding to the first axis. Each first combo capacitor set 24 includes a plurality of combo capacitor fingers 32 and a plurality of fixed combo capacitor fingers 34. The plurality of combo capacitor fingers 32 is extendedly formed from the first mass 18. The plurality of fixed combo capacitor fingers 34 is fixed to the substrate 12, arranged alternatively with the plurality of combo capacitor fingers 32, and parallel to the plurality of combo capacitor fingers 32. Accordingly, the first semiconductor layer 14 can sense the acceleration of the first mass 18 in the second axis according to the capacity variations of the first combo capacitor sets 24. As shown in FIG. 1, in this embodiment, numbers of the combo capacitor finger 32 on the two first combo capacitor sets 24 or numbers of the fixed combo capacitor finger 34 on the two first combo capacitor sets 24 are different from each other, so as to increase the capacity variations of the first combo capacitor sets 24. In such a manner, sensitivity of the first semiconductor layer 14 in sensing the capacity variations of the first combo capacitor sets 24 can be enhanced accordingly. The second combo capacitor sets 30 are respectively connected to two sides of the first mass 18 corresponding to the second axis. Accordingly, the first semiconductor layer 14 can sense the acceleration of the first mass 18 in the first axis according to the capacity variations of the second combo capacitor sets 30. As for the capacity sensing design of the second combo capacitor set 30, it can be reasoned according to the said description for the first combo capacitor set 24, and the related description is therefore omitted herein.

Figure 2:
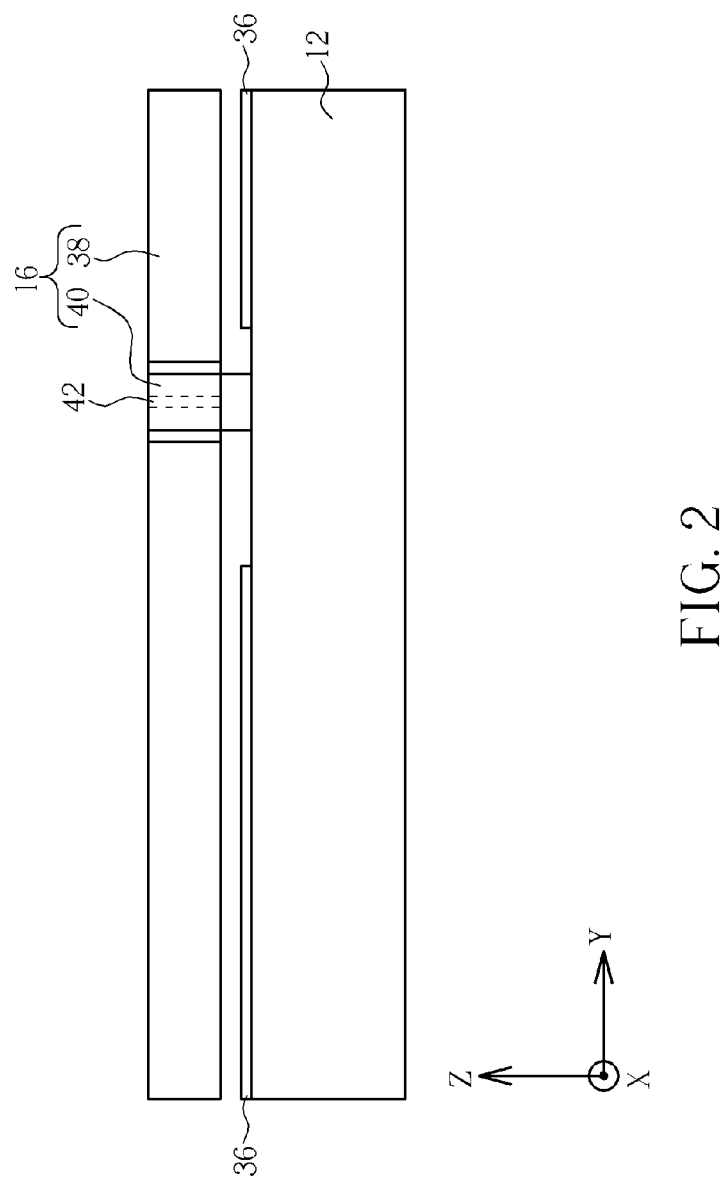
FIG. 2 is a side view of a second semiconductor layer in FIG. 1.

Next, please refer to FIG. 1 and FIG. 2. FIG. 2 is a side view of the second semiconductor layer 16 in FIG. 1. As shown in FIG. 1 and FIG. 2, the substrate 12 has at least one sensing electrode 36 (two shown in FIG. 2). The second semiconductor layer 16 includes a second mass 38 and at least one third anchor 40 (two shown in FIG. 2). In this embodiment, the second mass 38 has a torsion shaft 42 along the first axis. The third anchor 40 is connected to the torsion shaft 42 for making the second mass 38 asymmetrically disposed above the sensing electrode 36, so as to generate a sensing capacity with the sensing electrode 36. Accordingly, when a force is applied to the second mass 38 in a third axis (i.e. a z-axis direction as shown in FIG. 2), the second mass 38 is rotated relative to the torsion shaft 42 so as to change the sensing capacity between the second mass 38 and the sensing electrode 36. In other words, the second semiconductor layer 16 can sense the acceleration of the second mass 38 in the third axis according to the capacity variations between the second mass 38 and the sensing electrode 36. The configuration that the second mass 38 is asymmetrically disposed above the sensing electrode 36 is not limited to the design as shown in FIG. 1. That is, the present invention can also adopt the design that the second mass 38 has the torsion shaft 42 along the second axis instead, so as to make the second mass 38 asymmetrically disposed above the sensing electrode 36 along the first axis. As for which design is utilized, it depends on the practical application of the capacitive accelerometer 10.

In the said configuration, when a force is applied to the capacitive accelerometer 10 to cause the acceleration of the capacitive accelerometer 10 in the first axis, the first mass 18 moves elastically toward the first axis. At this time, the distance between the combo capacitor fingers and the fixed combo capacitor fingers on the second combo capacitor set 30 varies with the said elastic movement of the first mass 18 in the first axis, so as to change the capacity of the second combo capacitor set 30. Accordingly, the acceleration of the capacitive accelerometer 10 in the first axis can be determined according to the capacity variations of the second combo capacitor sets 30.

Similarly, when a force is applied to the capacitive accelerometer 10 to cause the acceleration of the capacitive accelerometer 10 in the second axis, the first mass 18 moves elastically toward the second axis. At this time, the distance between the combo capacitor fingers 32 and the fixed combo capacitor fingers 34 on the first combo capacitor set 24 varies with the said elastic movement of the first mass 18 in the second axis, so as to change the capacity of the first combo capacitor set 24. Accordingly, the acceleration of the capacitive accelerometer 10 in the second axis can be determined according to the capacity variations of the first combo capacitor sets 24.

Furthermore, when a force is applied to the capacitive accelerometer 10 to cause the acceleration of the capacitive accelerometer 10 in the third axis, the second mass 38 rotates relative to the torsion shaft 42 toward the third axis. At this time, the distance between the second mass 38 and the sensing electrode 36 on the substrate 12 varies with the said rotation of the second mass 38 in the third axis, so as to change the capacity between the second mass 38 and the sensing electrode 36. Accordingly, the acceleration of the capacitive accelerometer 10 in the third axis can be determined according to the capacity variations between the second mass 38 and the sensing electrode 36.

In summary, via assembly of the mass, the anchors, elastic members, and the combo capacitor sets on the first semiconductor layer 14 and assembly of the sensing electrodes on the substrate and the asymmetrically-rotatable mass on the second semiconductor layer 16, the capacitive accelerometer 10 can have a three-axis acceleration sensing function. To be noted, in this embodiment, as shown in FIG. 1, the present invention utilizes the design that the first elastic member 22 bends back and forth perpendicular to the first axis to replace the prior art design that the elastic member bends laterally between the mass and the anchor, so as to efficiently reduce the width of the first semiconductor layer 14 in the first axis. Similarly, the present invention utilizes the design that the second elastic member 28 bends back and forth perpendicular to the second axis, to reduce the width of the first semiconductor layer 14 in the second axis. Accordingly, the purpose of reducing space occupied by the first semiconductor layer 14 in the capacitive accelerometer 10 can be achieved for further decreasing the overall volume of the capacitive accelerometer 10.

Figure 3:
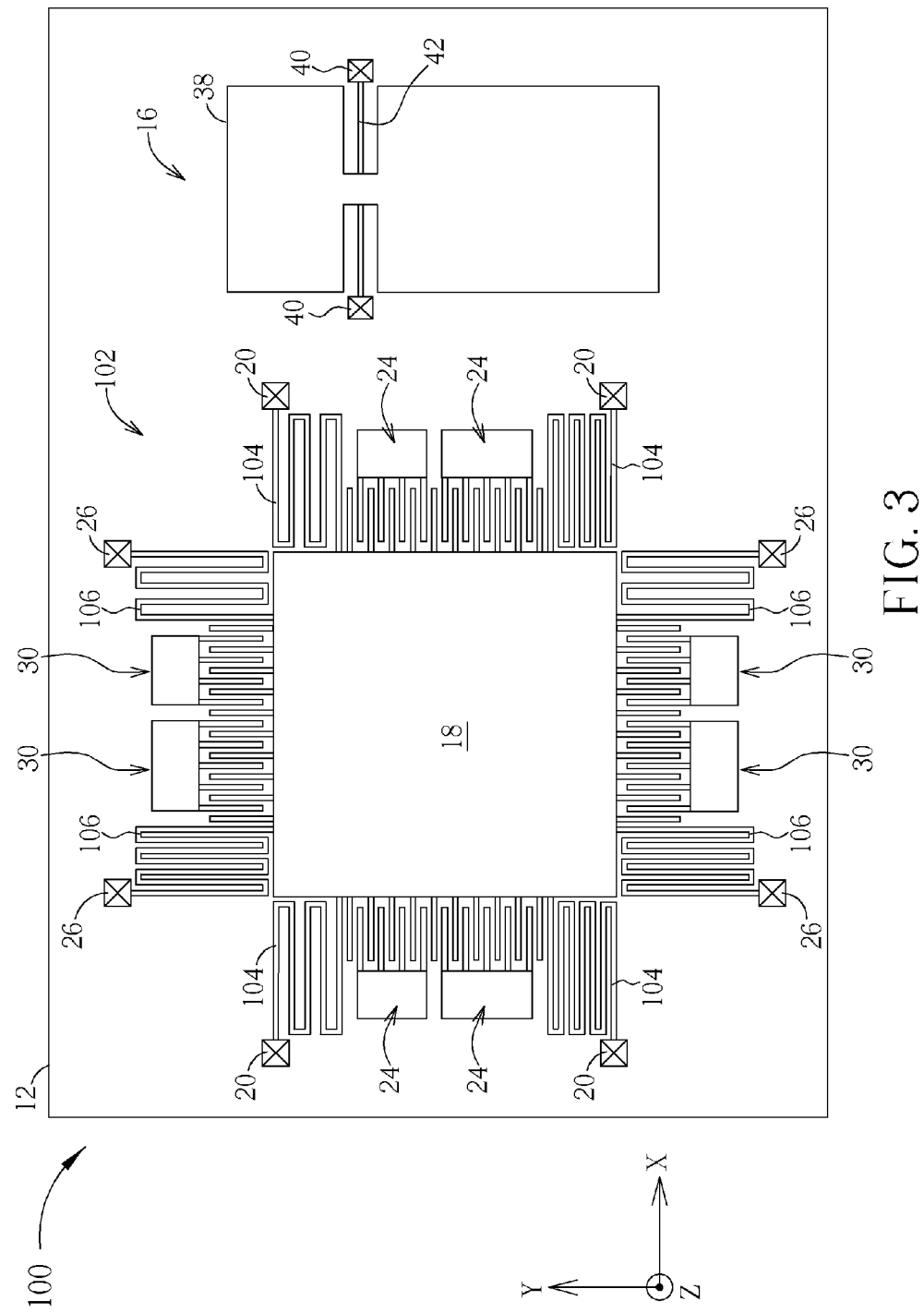
FIG. 3 is a top view of a capacitive accelerometer according to a second embodiment of the present invention.

Next, please refer to FIG. 3, which is a top view of a capacitive accelerometer 100 according to a second embodiment of the present invention. Components both mentioned in the second embodiment and the first embodiment represent components with similar functions or structures. The major difference between the capacitive accelerometer 100 and the capacitive accelerometer 10 is the bending design of the elastic member. As for the three-axis acceleration sensing design of the capacitive accelerometer 100, it can be reasoned according to the first embodiment and the related description is therefore omitted herein. As shown in FIG. 3, the capacitive accelerometer 100 includes the substrate 12, a first semiconductor layer 102, and the second semiconductor layer 16. The first semiconductor layer 102 is disposed on the substrate 12 and includes the first mass 18, at least two first anchors 20, at least two first elastic members 104, at least one first combo capacitor set 24, at least two second anchors 26, at least two second elastic members 106, and at least one second combo capacitor sets 30. In this embodiment, numbers of the first anchor 20, the first elastic member 104, the first combo capacitor set 24, the second anchor 26, the second elastic member 106, and the second combo capacitor set 30 are four respectively as shown in FIG. 3.

The first elastic member 104 is connected between the first mass 18 and the first anchor 20 in a manner of bending back and forth parallel to the first axis, for providing elastic force to make the first mass 18 move elastically along the second axis when a force is applied to the first mass 18 in the second axis. In this embodiment, the bending times of the first elastic members 104 are different from each other. For example, as shown in FIG. 3, the bending times of the first elastic members 104 respectively located at the upper-left corner and the upper-right corner of the first mass 18 are less than those located at the down-left corner and the down-right corner of the first mass 18, so that the movement of the first mass 18 in the second axis can be more sensitive when a force is applied to the first mass 18 in the second axis. Similarly, the second elastic member 106 is connected between the first mass 18 and the second anchor 26 in a manner of bending back and forth parallel to the second axis, for providing elastic force to make the first mass 18 move elastically along the first axis when a force is applied to the first mass 18 in the first axis. The bending times of the second elastic members 106 are also different from each other, so that the movement of the first mass 18 in the first axis can be more sensitive when a force is applied to the first mass 18 in the first axis. In such a manner, via the said design that the bending times of the elastic members are different from each other for making movement of the mass more sensitive and smooth, sensing linearity and sensitivity of the capacitive accelerometer 100 in the first axis and the second axis can be further improved.

Figure 4:
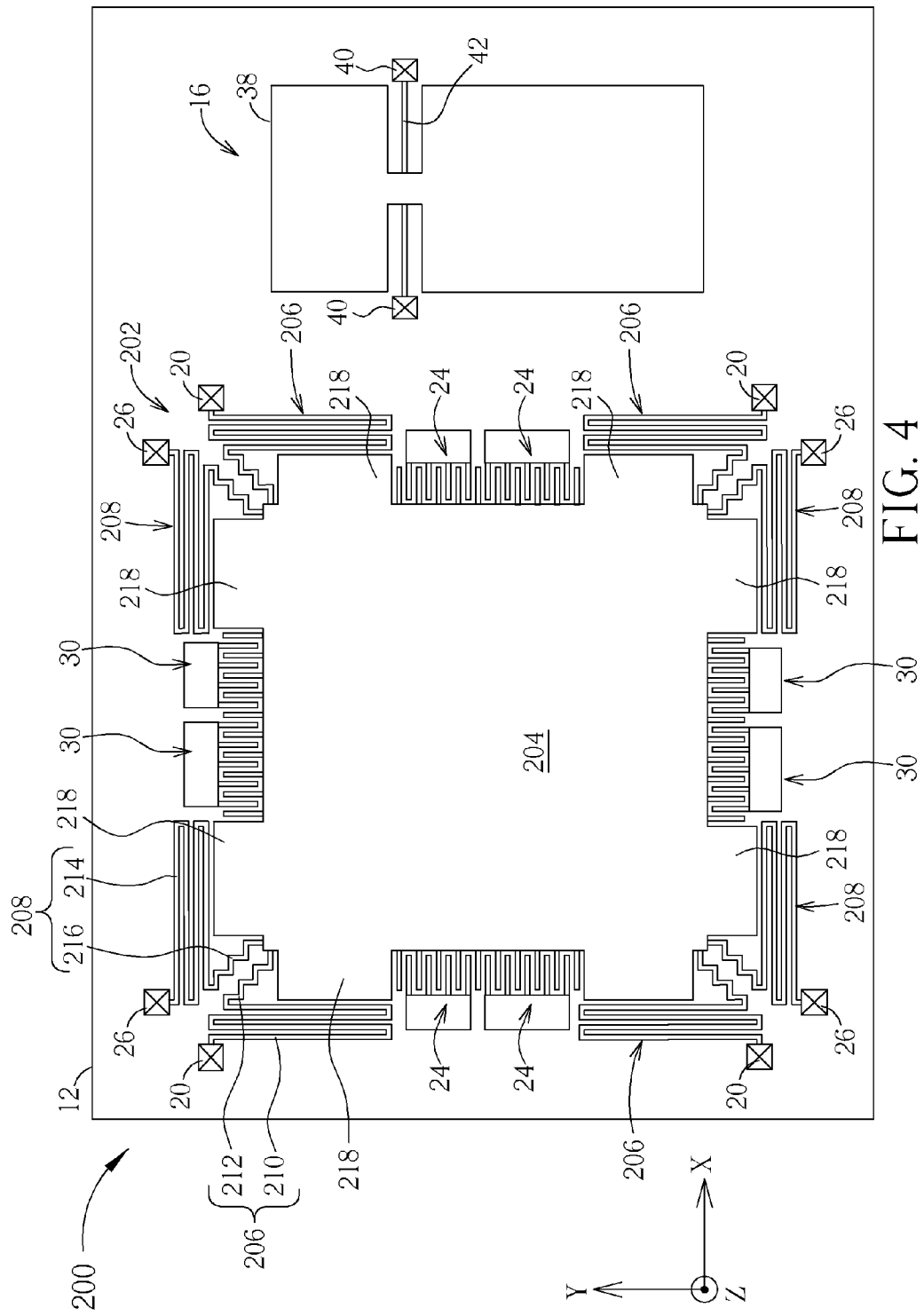
FIG. 4 is a top view of a capacitive accelerometer according to a third embodiment of the present invention.

Next, please refer to FIG. 4, which is a top view of a capacitive accelerometer 200 according to a third embodiment of the present invention. Components both mentioned in the third embodiment and the first embodiment represent components with similar functions or structures. The major difference between the capacitive accelerometer 200 and the capacitive accelerometer 10 is the bending design of the elastic member. As for the three-axis acceleration sensing design of the capacitive accelerometer 200, it can be reasoned according to the first embodiment and the related description is therefore omitted herein. As shown in FIG. 4, the capacitive accelerometer 200 includes the substrate 12, a first semiconductor layer 202, and the second semiconductor layer 16. The first semiconductor layer 202 is disposed on the substrate 12 and includes a first mass 204, at least one first anchor 20, at least one first elastic member 206, at least one first combo capacitor set 24, at least one second anchor 26, at least one second elastic members 208, and at least one second combo capacitor sets 30. In this embodiment, numbers of the first anchor 20, the first elastic member 206, the first combo capacitor set 24, the second anchor 26, the second elastic member 208, and the second combo capacitor set 30 are four respectively as shown in FIG. 4.

The first elastic member 104 has a first bending structure 210 and a first step structure 212. The first bending structure 210 is connected to the first anchor 20 in a manner of bending back and forth perpendicular to the first axis. The first step structure 212 is connected between the first mass 204 and the first bending structure 210. The second elastic member 208 has a second bending structure 214 and a second step structure 216. The second bending structure 214 is connected to the second anchor 26 in a manner of bending back and forth perpendicular to the second axis. The second step structure 216 is connected between the first mass 204 and the second bending structure 214. In such a manner, compared with the prior art only utilizing the bending structure to be connected to the anchor and the mass, the present invention utilizes the step structure (i.e. the first step structure 212 and the second step structure 216) to be connected to the bending structure (i.e. the first bending structure 210 and the second bending structure 214) and the mass (i.e. the first mass 204) instead, so as to reduce space occupied by the first elastic member 206 and the second elastic member 208 on the first semiconductor layer 202. Accordingly, a protruding block 218 can extend from the first mass 204 corresponding to the first step structure 212 and the second step structure 216 respectively. That is, the overall weight of the first mass 204 can be increased without additionally increasing the overall volume of the first semiconductor layer 202, so as to make movement of the first mass 204 in the first axis and the second axis more sensitive. Thus, sensing linearity and sensitivity of the capacitive accelerometer 200 in the first axis and the second axis can be further improved.

It should be mentioned that the bending directions of the first elastic member 206 and the second elastic member 208 are not limited to the aforesaid embodiment. For example, the first bending structure 210 of the first elastic member 206 can change to be connected to the first anchor 20 in a manner of bending back and forth parallel to the first axis, and the second bending structure 214 of the second elastic member 208 can correspondingly change to be connected to the second anchor 26 in a manner of bending back and forth parallel to the second axis.

Figure 5:
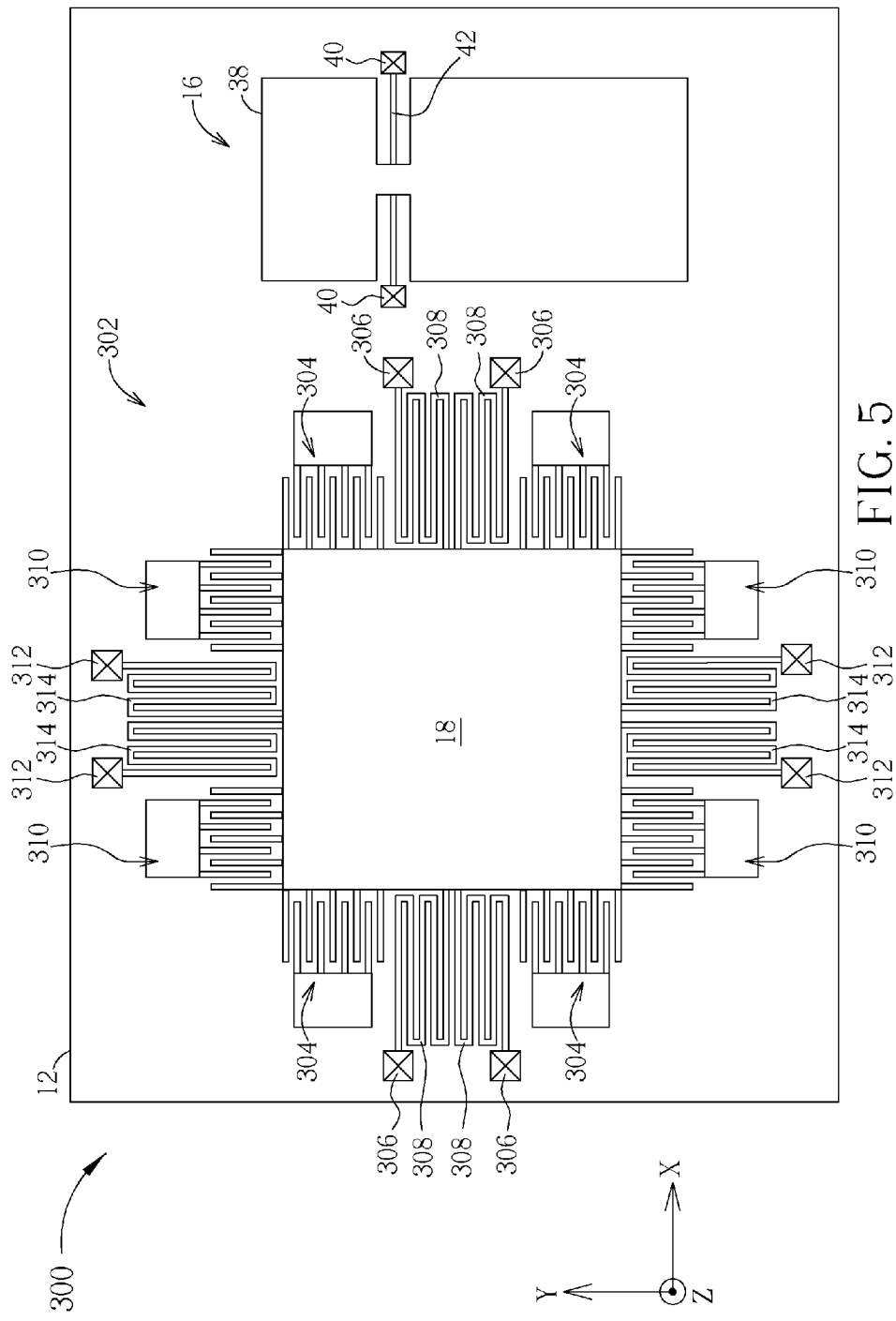
FIG. 5 is a top view of a capacitive accelerometer according to a fourth embodiment of the present invention.

Finally, please refer to FIG. 5, which is a top view of a capacitive accelerometer 300 according to a fourth embodiment of the present invention. Components both mentioned in the fourth embodiment and the first embodiment represent components with similar functions or structures. The major difference between the capacitive accelerometer 300 and the capacitive accelerometer 10 is assembly of the anchors, the elastic members, and the combo capacitor sets. As for the three-axis acceleration sensing design of the capacitive accelerometer 300, it can be reasoned according to the first embodiment and the related description is therefore omitted herein. As shown in FIG. 5, the capacitive accelerometer 300 includes the substrate 12, a first semiconductor layer 302, and the second semiconductor layer 16. The first semiconductor layer 302 is disposed on the substrate 12 and includes the first mass 18, at least two first combo capacitor sets 304, at least one first anchor 306, at least one first elastic member 308, at least two second combo capacitor sets 310, at least one second anchor 312, and at least one second elastic member 314. In this embodiment, numbers of the first combo capacitor set 304, the first anchor 306, the first elastic member 308, the second combo capacitor set 310, the second anchor 312, and the second elastic member 314 are four respectively as shown in FIG. 5.

The first combo capacitor set 304 is connected to two sides of the first mass 18 corresponding to the first axis respectively. The first anchor 306 is disposed between the first combo capacitor sets 304. The second combo capacitor set 310 is connected to two sides of the first mass 18 corresponding to the second axis respectively. The second anchor 312 is disposed between the second combo capacitor sets 310. Furthermore, the first elastic member 308 is connected between the first mass 18 and the first anchor 306 in a manner of bending back and forth parallel to the first axis, and the second elastic member 314 is connected between the first mass 18 and the second anchor 312 in a manner of bending back and forth parallel to the second axis.

In such a manner, via the said design that the elastic member is disposed between the combo capacitor sets, movement of the first mass 18 in the first axis and the second axis can be more sensitive so as to improve sensing linearity and sensitivity of the capacitive accelerometer 300 in the first axis and the second axis.

It should be mentioned that the design that the bending times of the elastic members are different from each other and the design that numbers of the combo capacitor finger on the combo capacitor sets or numbers of the fixed capacitor finger on the combo capacitor sets are different from each other can be mutually applied to the aforesaid embodiments, so as to make the structural design of the capacitive accelerometer provided by the present invention more flexible. Furthermore, the second semiconductor layer mentioned in the aforesaid embodiments can be an omissible component for simplifying the structural design of the capacitive accelerometer provided by the present invention. In other words, the capacitive accelerometer provided by the present invention can only have the first semiconductor layer for two-axis acceleration sensing.

Compared with the prior art utilizing three independent masses with the related sensing electrode components to sense accelerations in three axes independently, the present invention utilizes the configuration that the second semiconductor layer (for sensing the acceleration of the capacitive accelerometer in the third axis) is located at a side of the first semiconductor layer (for sensing the accelerations of the capacitive accelerometer in the first axis and the second axis), to prevent the capacitive accelerometer form being oversized. Furthermore, via the design for making the bending times of the elastic members different from each other or changing the bending directions of the elastic members, the design for making numbers of the combo capacitor finger on the combo capacitor sets or numbers of the fixed combo capacitor finger on the combo capacitor sets different from each other, or the design for changing the configuration of the combo capacitor sets and the elastic members, the present invention can further reduce the overall volume of the capacitive accelerometer or improve linearity and sensitivity of the capacitive accelerometer in the first axis and the second axis.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capacitive accelerometer comprising:
    a substrate; and
    a first semiconductor layer disposed on the substrate, the first semiconductor layer comprising:
        a first mass;
        two first anchors located on at least one side of the first mass corresponding to a first axis;
        two first elastic members, each first elastic member being connected to the first mass and the corresponding first anchor in a manner of bending back and forth perpendicular to the first axis, for making the first mass move elastically along the first axis when a force is applied to the first mass in the first axis, and the bending times of the two first elastic members being different from each other;
        at least one first combo capacitor set connected to at least one side of the first mass corresponding to a second axis;
        at least one second anchor located on at least one side of the first mass corresponding to the second axis;
        a second elastic member connected to the first mass and the second anchor in a manner of bending back and forth perpendicular to the second axis, for making the first mass move elastically along the second axis when a force is applied to the first mass in the second axis; and
        at least one second combo capacitor set connected to at least one side of the first mass corresponding to the first axis;
    wherein the first axis is perpendicular to the second axis.

2. The capacitive accelerometer of claim 1, wherein substrate has at least one sensing electrode and the capacitive accelerometer further comprises:
    a second semiconductor layer disposed on the substrate and located at a side of the first semiconductor layer, the second semiconductor layer comprising:
        a second mass having a torsion shaft along the first axis or the second axis for generating a sensing capacity with the sensing electrode; and
        at least one third anchor connected to the torsion shaft for making the second mass asymmetrically disposed above the sensing electrode;
    wherein the second mass is rotated relative to the torsion shaft when a force is applied to the second mass in a third axis, and the third axis is perpendicular to the first axis and the second axis.

3. The capacitive accelerometer of claim 1, wherein the first semiconductor layer comprises two first combo capacitor sets and each first combo capacitor set comprises:
- a plurality of combo capacitor fingers extendedly formed from the first mass; and
- a plurality of fixed combo capacitor fingers fixed to the substrate, arranged alternatively with the plurality of combo capacitor fingers, and parallel to the plurality of combo capacitor fingers;
- wherein numbers of the combo capacitor finger on the two first combo capacitor sets or numbers of the fixed combo capacitor finger on the two first combo capacitor sets are different from each other.

4. A capacitive accelerometer comprising:
- a substrate; and
- a first semiconductor layer disposed on the substrate, the first semiconductor layer comprising:
  - a first mass;
  - at least two first anchors respectively located on at least one side of the first mass corresponding to a first axis;
  - two first elastic members respectively connected to the first mass and the corresponding first anchor in a manner of bending back and forth parallel to the first axis, for making the first mass move elastically along a second axis when a force is applied to the first mass in the second axis;
  - at least one first combo capacitor set connected to at least one side of the first mass corresponding to the first axis;
  - at least two second anchors respectively located on at least one side of the first mass corresponding to the second axis;
  - two second elastic members respectively connected to the first mass and the corresponding second anchor in a manner of bending back and forth parallel to the second axis, for making the first mass move elastically along the first axis when a force is applied to the first mass in the first axis; and
  - at least one second combo capacitor set connected to at least one side of the first mass corresponding to the second axis;
- wherein the bending times of the two first elastic members are different from each other, and the first axis is perpendicular to the second axis.

5. The capacitive accelerometer of claim 4, wherein the substrate has at least one sensing electrode and the capacitive accelerometer further comprises:
- a second semiconductor layer disposed on the substrate and located at a side of the first semiconductor layer, the second semiconductor layer comprising:
  - a second mass having a torsion shaft along the first axis or the second axis for generating a sensing capacity with the sensing electrode; and
  - at least one third anchor connected to the torsion shaft for making the second mass asymmetrically disposed above the sensing electrode;
- wherein the second mass is rotated relative to the torsion shaft when a force is applied to the second mass in a third axis, and the third axis is perpendicular to the first axis and the second axis.

6. The capacitive accelerometer of claim 4, wherein the first semiconductor layer comprises two first combo capacitor sets and each first combo capacitor set comprises:
- a plurality of combo capacitor fingers extendedly formed from the first mass; and
- a plurality of fixed combo capacitor fingers fixed to the substrate, arranged alternatively with the plurality of combo capacitor fingers, and parallel to the plurality of combo capacitor fingers;
- wherein numbers of the combo capacitor finger on the two first combo capacitor sets or numbers of the fixed combo capacitor finger on the two first combo capacitor sets are different from each other.

7. A capacitive accelerometer comprising:
- a substrate; and
- a first semiconductor layer disposed on the substrate, the first semiconductor layer comprising:
  - a first mass;
  - at least one first anchor located on at least one side of the first mass corresponding to a first axis;
  - a first elastic member having a first bending structure and a first step structure, the first bending structure being connected to the first anchor in a manner of bending back and forth corresponding to the first axis, the first step structure being connected between the first mass and the first bending structure and having a plurality of steps continuously formed thereon;
  - at least one first combo capacitor set connected to at least one side of the first mass corresponding to the first axis;
  - at least one second anchor located on at least one side of the first mass corresponding to a second axis;
  - a second elastic member having a second bending structure and a second step structure, the second bending structure being connected to the second anchor in a manner of bending back and forth corresponding to the second axis, the second step structure being connected between the first mass and the second bending structure and having a plurality of steps continuously formed thereon, at least two protruding blocks being formed on the first mass corresponding to the first step structure and the second step structure respectively; and
  - at least one second combo capacitor set connected to at least one side of the first mass corresponding to the second axis;
- wherein the first axis is perpendicular to the second axis.

8. The capacitive accelerometer of claim 7, wherein the substrate has at least one sensing electrode and the capacitive accelerometer further comprises:
- a second semiconductor layer disposed on the substrate and located at a side of the first semiconductor layer, the second semiconductor layer comprising:
  - a second mass having a torsion shaft along the first axis or the second axis for generating a sensing capacity with the sensing electrode; and
  - at least one third anchor connected to the torsion shaft for making the second mass asymmetrically disposed above the sensing electrode;
- wherein the second mass is rotated relative to the torsion shaft when a force is applied to the second mass in a third axis, and the third axis is perpendicular to the first axis and the second axis.

9. The capacitive accelerometer of claim 7, wherein the first semiconductor layer comprises two first combo capacitor sets and each first combo capacitor set comprises:
- a plurality of combo capacitor fingers extendedly formed from the first mass;
- a plurality of fixed combo capacitor fingers fixed to the substrate, arranged alternatively with the plurality of combo capacitor fingers, and parallel to the plurality of combo capacitor fingers;

wherein numbers of the combo capacitor finger on the two first combo capacitor sets or numbers of the fixed combo capacitor finger on the two first combo capacitor sets are different from each other.

10. The capacitive accelerometer of claim 7, wherein the first bending structure is connected between the first anchor and the first step structure in a manner of bending back and forth perpendicular to the first axis and the second bending structure is connected between the second anchor and the second step structure in a manner of bending back and forth perpendicular to the second axis.

11. The capacitive accelerometer of claim 7, wherein the first bending structure is connected between the first anchor and the first step structure in a manner of bending back and forth parallel to the first axis, and the second bending structure is connected between the second anchor and the second step structure in a manner of bending back and forth parallel to the second axis.

12. The capacitive accelerometer of claim 7, wherein the first semiconductor layer comprises two first anchors and two first elastic members, each first bending structure is connected between the first mass and the corresponding first anchor in a manner of bending back and forth corresponding to the first axis, and the bending times of the two first bending structures are different from each other.

13. A capacitive accelerometer comprising:
a substrate; and
a first semiconductor layer disposed on the substrate, the first semiconductor layer comprising:
  a first mass;
  at least two first combo capacitor sets connected to at least one side of the first mass corresponding to a first axis;
  at least two first anchors disposed between the two first combo capacitor sets and located at the same side where the at least two first combo capacitor sets are connected to the first mass;
  at least two first elastic members located between the at least two first combo capacitor sets and located at the same side where the at least two first combo capacitor sets are connected to the first mass, each first elastic member being connected between the first mass and the corresponding first anchor in a manner of bending back and forth corresponding to the first axis;
  at least two second combo capacitor sets connected to at least one side of the first mass corresponding to a second axis;
  at least one second anchor disposed between the two second combo capacitor sets; and
  a second elastic member connected between the first mass and the second anchor in a manner of bending back and forth corresponding to the second axis;
wherein the first axis is perpendicular to the second axis.

14. The capacitive accelerometer of claim 13, wherein the substrate has at least one sensing electrode and the capacitive accelerometer further comprises:
a second semiconductor layer disposed on the substrate and located at a side of the first semiconductor layer, the second semiconductor layer comprising:
  a second mass having a torsion shaft along the first axis or the second axis for generating a sensing capacity with the sensing electrode; and
  at least one third anchor connected to the torsion shaft for making the second mass asymmetrically disposed above the sensing electrode;
wherein the second mass is rotated relative to the torsion shaft when a force is applied to the second mass in a third axis, and the third axis is perpendicular to the first axis and the second axis.

15. The capacitive accelerometer of claim 13, wherein the first semiconductor layer comprises two first combo capacitor sets and each first combo capacitor set comprises:
a plurality of combo capacitor fingers extendedly formed from the first mass;
a plurality of fixed combo capacitor fingers fixed to the substrate, arranged alternatively with the plurality of combo capacitor fingers, and parallel to the plurality of combo capacitor fingers;
wherein numbers of the combo capacitor finger on the two first combo capacitor sets or numbers of the fixed combo capacitor finger on the two first combo capacitor sets are different from each other.

16. The capacitive accelerometer of claim 13, wherein the first elastic member is connected between the first anchor and the first mass in a manner of bending back and forth perpendicular to the first axis, and the second elastic member is connected between the second anchor and the first mass in a manner of bending back and forth perpendicular to the second axis.

17. The capacitive accelerometer of claim 13, wherein the first elastic member is connected between the first support base and the first mass in a manner of bending back and forth parallel to the first axis, and the second elastic member is connected between the second anchor and the first mass in a manner of bending back and forth parallel to the second axis.

18. The capacitive accelerometer of claim 13, wherein the first semiconductor layer comprises two first anchors and two first elastic members, each first elastic member is connected between the first mass and the corresponding first anchor in a manner of bending back and forth corresponding to the first axis, and the bending times of the two first elastic members are different from each other.

* * * * *